Figure 1:
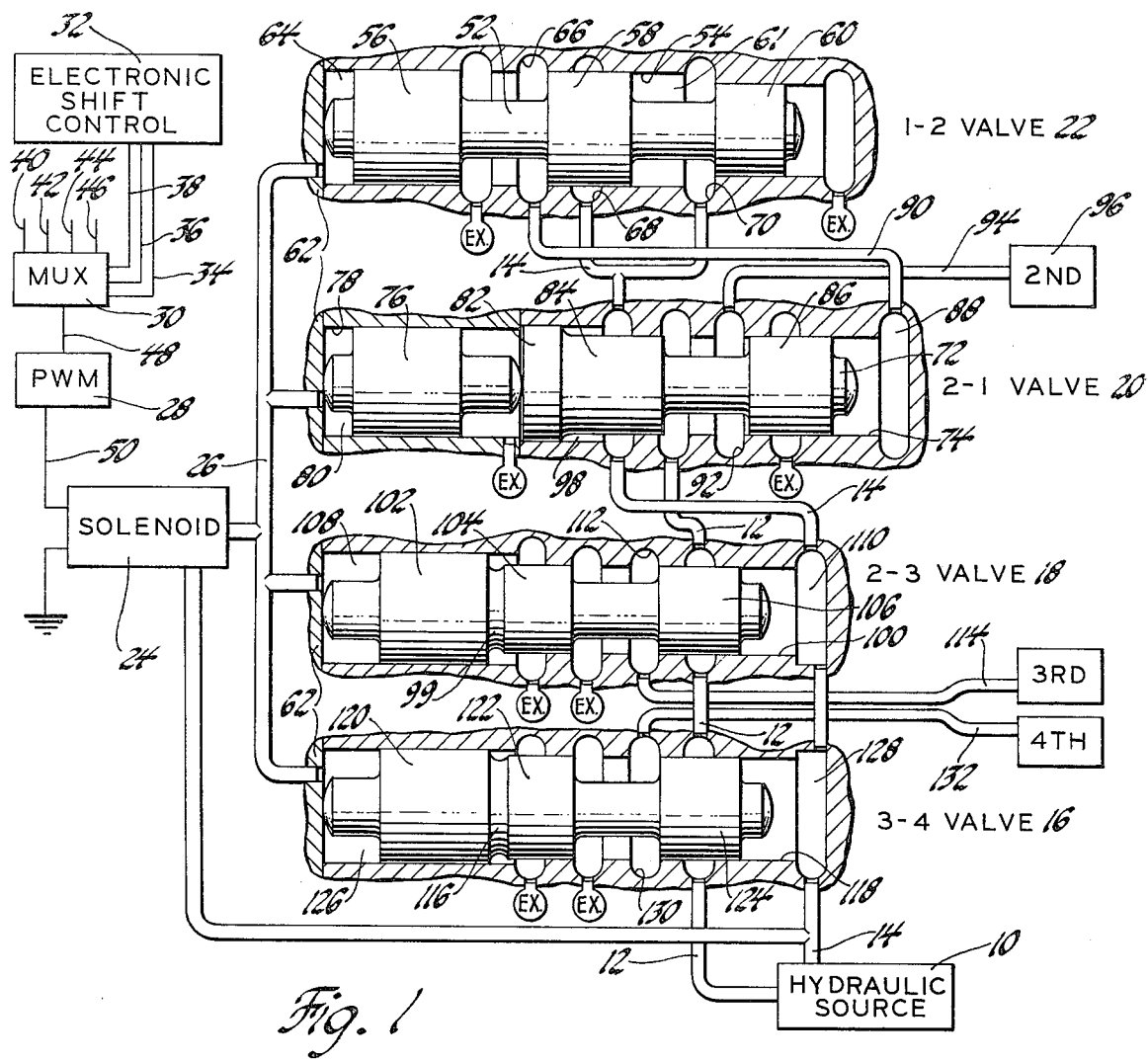

United States Patent [19]

Fochtman et al.

[11]  4,252,148

[45]  Feb. 24, 1981

[54] HYDRAULIC CONTROL FOR A TRANSMISSION

[75] Inventors: David L. Fochtman, Ypsilanti; William J. Vukovich, Pittsfield Township, Washtenaw County, both of Mich.

[73] Assignee: General Motors Corporation, Detroit, Mich.

[21] Appl. No.: 64,079

[22] Filed: Aug. 6, 1979

[51] Int. Cl.³ .................... E03B 0/00; B60K 41/18
[52] U.S. Cl. .................... 137/596.15; 74/866; 74/868; 74/869; 74/DIG. 1
[58] Field of Search ........... 74/866, 868, 869, DIG. 1; 137/596.15, 596.16; 251/30

[56] References Cited

U.S. PATENT DOCUMENTS

| | | | |
|---|---|---|---|
| 3,041,892 | 7/1962 | Schjolin | 74/DIG. 1 |
| 3,052,262 | 9/1962 | McCann | 137/596.15 X |
| 3,760,843 | 9/1973 | Larner | 137/596.15 |
| 3,943,973 | 3/1976 | Zettergren | 137/596.16 X |
| 4,031,782 | 6/1977 | Miller et al. | 74/866 |
| 4,116,321 | 9/1978 | Miller | 192/103 F |

*Primary Examiner*—C. J. Husar
*Assistant Examiner*—Frank McKenzie
*Attorney, Agent, or Firm*—Donald F. Scherer

[57] ABSTRACT

A hydraulic control for an automatic transmission has a plurality of shift control valves for controlling the interchange of drive ratios within the transmission. The shift control valves each have a control chamber subjected to substantially constant pressure and a shift control chamber having an area proportional to the respective control chamber which is subjected to a variable control pressure. The variable control pressure is controlled at discrete levels by a single pulse width modulator (PWM) solenoid. The respective area ratios of the shift control chambers to the controlled chambers determines the distinct shift point of each shift valve.

3 Claims, 2 Drawing Figures

HYDRAULIC CONTROL FOR A TRANSMISSION

This invention relates to transmission controls and more particularly to hydraulic controls having solenoid controlled shift valves.

There are a number of prior art transmission controls which utilize solenoid valves for controlling the upshifting and downshifting of the shift valves. These control devices require that a separate solenoid control member be utilized for each shift valve within the system. Therefore, if the hydraulic control system has three shift valves, it requires three solenoid valves.

The present invention overcomes this disadvantage by utilizing a single solenoid valve to control a plurality of shift valves. Each shift valve has a control chamber of a predetermined area and a shift control chamber of a predetermined area larger than the respective control chamber. The area ratio between the control chamber and shift control chamber for each valve is distinct such that when a fixed pressure or constant pressure is applied to the control chamber and a variable control pressure is applied to the shift control chamber, each valve will shift when the pressure ratio is substantially equal to or slightly greater than its area ratio. The pressure which operates on the shift control chamber is responsive to a pulse width modulator solenoid valve which creates an outlet pressure dependent on the duty cycle of the solenoid.

In the preferred embodiment of the present invention, the solenoid valve control has four distinct duty cycles and therefore four distinct pressure levels to provide controlled shifting within a four-speed transmission.

It is an object of this invention to provide an improved transmission control wherein a plurality of hydraulic shift control valves respond to a single solenoid valve.

It is another object of this invention to provide an improved hydraulic control for a transmission wherein a plurality of shift control valves each has an area ratio between a control chamber and a shift control chamber and wherein the fluid pressure operating in the control chamber is substantially constant while the fluid pressure acting in the shift control chamber is variably controlled by a single solenoid valve.

Figure 2:
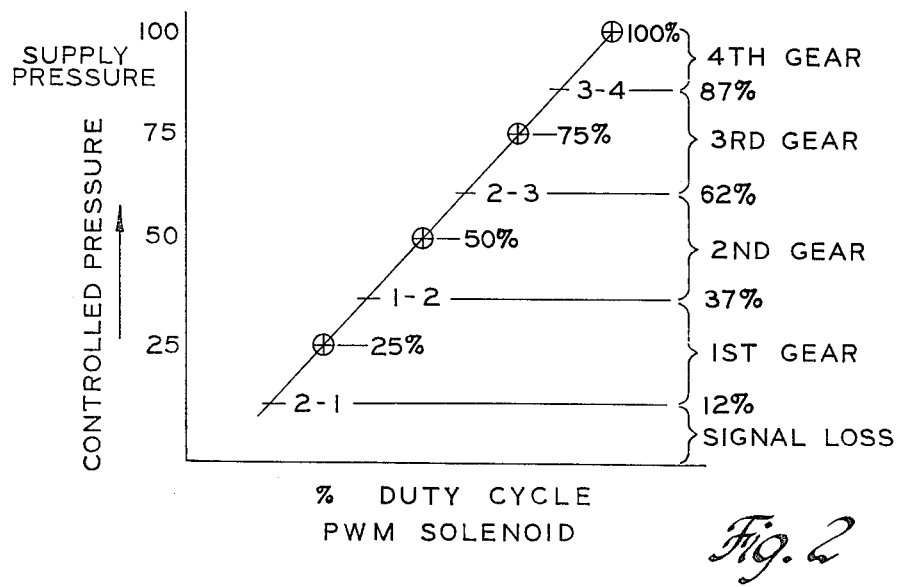

These and other objects and advantages of the present invention will be more apparent from the following description and drawings in which:

FIG. 1 is a diagrammatic representation of a portion of a hydraulic control; and FIG. 2 is a graph showing the relationship between solenoid duty cycle and controlled pressure.

Referring to the drawings, there is seen in FIG. 1 a hydraulic source 10 which is a conventional hydraulic pump and regulator valves which produce a conventional main line pressure in passage 12 and a substantially constant supply pressure in passage 14. The main line pressure in passage 12 is communicated to a 3-4 valve 16, a 2-3 valve 18 and a 2-1 valve 20. The supply pressure in passage 14 is connected to the same three valves and is further connected to a 1-2 shift valve 22 and a solenoid valve, generally designated 24. The solenoid valve 24 is operable to provide a variable output pressure to a control passage 26 which is connected to each of the valves 16 through 22.

The solenoid valve may be constructed in accordance with the control valve shown in U.S. Pat. No. 3,225,619 issued to Schaefer on Dec. 28, 1965, or in accordance with any other solenoid valve which will provide an output pressure which can be varied in accordance with the signal applied to the solenoid coil. The valve 24 is incorporated in an electrical circuit which includes a pulse width modulator (PWM) 28, a multiplexer 30 and an electronic shift control module 32. The shift control module 32 can be constructed in accordance with the teaching of Nelson, U.S. Pat. No. 3,448,640 issued June 10, 1969. This type of electronic shift control will provide discrete output signals and for the preferred embodiment shown, there are three discrete signals required which are delivered through electrical connections 34, 36 and 38 to the multiplexer 30. The multiplexer 30 is a conventional electronic device which is capable of taking four discrete input levels represented by lines 40, 42, 44 and 46 and providing a single output signal in line 48 depending upon the control signals received through lines 34, 36 and 38. The line 48 is connected to the pulse width modulator 28 which is a conventional electronic device such as a voltage control oscillator of the type which has an output duty cycle regulated as a function of the DC voltage input. The output duty cycle of the pulse width modulator 28 is conducted through a passage 50 to the solenoid valve 24.

The multiplexer 30 preferably has four distinct voltage level input on lines 40, 42, 44 and 46 which, depending upon the control signals received from the electronic shift control 32, will be passed to the pulse width modulator 28 which will in turn produce an output. For example, if there is no signal from electronic shift control 32, the output of the pulse width modulator 28 will be a 25% duty cycle. If line 34 is energized, the multiplexer 30 will pass a high DC voltage signal to the pulse width modulator 28 so that a 50% duty cycle will be output by the pulse width modulator 28. If both lines 34 and 36 are energized, the pulse width modulator 28 will output a duty cycle of 75%, and if all three lines 34, 36 and 38 are energized, the pulse width modulator 28 will output a duty cycle of 100%. For each duty cycle, the solenoid valve 24 will have a corresponding control pressure as shown in FIG. 2. That is, with a 25% duty cycle, the control pressure will be 25% of the supply pressure.

The 1-2 valve 22 includes a valve spool 52 slidably disposed in a stepped valve bore 54. The valve spool 52 has equal diameter lands 56 and 58 and a smaller diameter land 60. The differential area between lands 58 and 60 cooperate with valve bore 54 to form a control chamber 61. The left side of land 56 cooperates with an end plate 62 and valve bore 54 to form a shift control chamber 64 which is in fluid communication with passage 26. In the position shown, the space between lands 56 and 58 is in fluid communication with an exhaust port and with a control port 66. The valve bore 54 is connected, by two ports 68 and 70, to the supply passage 14, and the right hand side of valve bore 54 is connected to an exhaust port. As can be seen, control chamber 61 is connected to supply passage 14 which, as previously described, has a substantially constant pressure therein. The control chamber 61 has an area equal to 37% of the area of the shift control chamber 64. Therefore, if the fluid pressure in passage 26 is equal to or less than 37% of the fluid pressure in passage 14, the valve spool 52 will be in the position shown. However, if the pressure in passage 26 exceeds 37% of the pressure in passage 14, the valve spool 52 will move to the upshifted position at which time the land 56 will close the exhaust port and provide fluid communication between port 68 and 66 so that supply pressure will be available at port 66.

The 2-1 valve 20 has a valve spool 72 slidably disposed in a stepped diameter valve bore 74 and a plug spool 76 slidably disposed in a valve bore 78. The plug spool 76 cooperates with valve bore 78 and end cap 62 to form a shift control chamber 80 which is in fluid communication with the passage 26. The valve spool 72 has a large diameter land 82 and two equal diameter spaced lands 84 and 86. The left end of valve spool 72 is in abutting relationship with plug spool 76 while the land 86 cooperates with valve bore 74 to form a chamber 88 which is in fluid communication through passage 90 with port 66 of the 1-2 valve 22. In the position shown, the space between lands 84 and 86 is connected to passage 12 and also to a port 92 which is connected to a passage 94 which is in turn in fluid communication with a conventional fluid operated friction drive establishing device 96 which is operable to establish second gear ratio within a conventional four-speed transmission, not shown. The differential area between lands 82 and 84 is in fluid communication with supply passage 14 which creates a force on the valve operable to urge the valve spool 72 to the left against the force created by the control pressure in chamber 80 operating on plug spool 76. The differential area between lands 82 and 84, and valve bore 74, form a control chamber 98 which is approximately 12% of the area of shift control chamber 80. When the control pressure in passage 26 is equal to or less than 12% of the supply pressure in passage 14, the valve 20 will be in the position shown. However, when the control pressure in passage 26 exceeds 12% of the supply pressure, the valve spool 72 will move to the right thereby disconnecting the port 92 from passage 12 while connecting port 92 to exhaust to disengage the drive establishing device 96. However, if the 1-2 valve 22 has been moved to the upshift position by fluid pressure within shift control chamber 64, the passage 90 will be connected to chamber 88 such that the force resulting from fluid pressure operating on chambers 88 and 98 will be greater than the force resulting from the control pressure in chamber 80 such that the valve spool 72 will be in the position shown and fluid pressure will be directed to passage 94.

The 2-3 valve 18 includes a spool valve 99 which is slidably disposed in a stepped diameter valve bore 100 and has a large diameter land 102 and two smaller but equal diameter lands 104 and 106. The land 102 cooperates with the valve bore 100 to form a shift control chamber 108 while the land 106 cooperates with the valve bore 100 to form a control chamber 110. The shift control chamber 108 is in fluid communication with passage 26 while the control chamber 110 is in fluid communication with supply passage 14. The relative relationship between the diameters of lands 102 and 106 are such that the area of control chamber 110 is equal to 62% of the area of shift control chamber 108 and therefore the control pressure in passage 26 must be greater than 62% of the supply pressure before an upshift can occur in the 2-3 valve. In the downshift position shown, the port 112 of the 2-3 valve 18 communicates an exhaust port with a passage 114 which in turn is connected to a conventional fluid operated friction drive establishing device operable to establish a third gear ratio within the transmission. When the pressure in passage 26 exceeds 62% of the pressure in passage 14, the 2-3 valve 18 will be upshifted thereby providing a fluid connection between passages 12 and 114 between lands 104 and 106 so that the third gear establishing device is engaged.

The 3-4 valve 16 includes a valve spool 116 slidably disposed in a stepped diameter valve bore 118. The valve spool 116 has a large diameter land 120 and two smaller but equal diameter lands 122 and 124. The land 120 cooperates with the valve bore 118 to form a shift control chamber 126 which is connected with passage 26 while the land 124 cooperates with bore 118 to form a control chamber 128 which is in fluid communication with supply passage 14 and has an area that is 87% of the area of chamber 126. The valve bore 118 is in fluid communication through a port 130 and passage 132 with a friction drive establishing device which is operable to establish the fourth gear ratio in the transmission. In the downshift position shown, the passage 132 is communicated to exhaust between the lands 122 and 124. When the control pressure in passage 26 exceeds 87% of the pressure in supply passage 14, the valve spool 116 will be upshifted thereby providing a fluid connection between passages 12 and 132 so that the fourth gear ratio device is energized or engaged to establish the fourth gear within the transmission.

The transmissions utilized with the preferred embodiment of this control as shown in FIG. 1, utilize one-way devices in series with the friction devices in the reaction systems for the planetary gear sets. Such transmissions are well-known in the art. For the first or lowest gear ratio, the one-way device is the only reaction mechanism and a friction device is not used. For second gear operation, the one-way reaction member is formed in series with the friction device and the same is true of third gear operation. Fourth gear is generally a direct drive using two friction clutches in a well-known manner. This simplifies the timing sequence necessary during upshifting and down-shifting since all ratio interchanges involve the use of a one-way drive establishing device. The simplicity and efficiency of such systems is well-known and it is not believed that further dissertation of such mechanisms is required here.

The control system described in FIG. 1 is designed such that if for some reason the solenoid 24 does not receive an electrical signal, the pressure in passage 26 will be substantially zero and in any event, considerably less than 12% of the fluid pressure in passage 14. Under this condition, the valves 16, 18, 20 and 22 will be in a position as shown, and the transmission will be conditioned for second gear ratio. This is considered to be an acceptable operating mode when the electrical control systems malfunction. It should also be appreciated that the hydraulic source 10 will incorporate a conventional manually operated valve which will permit manual shifting to reverse, neutral and drive, as is currently available in automatic transmissions for passenger vehicles.

Assuming that the electrical control signals are being generated and that a drive condition has been selected, the output of solenoid valve 24 will be 25% of the supply pressure in passage 14 until the electronic shift control 32 signals that a 1-2 upshift is preferred. At this time, valve spool 72 of the 2-1 valve 20 will be shifted to the right and the transmission will be conditioned for first gear operation.

When the electronic shift control 32 demands an upshift, the multiplexer 30 and pulse width modulator 28 will operate such that the control pressure in passage 26 will be equal to 50% of the supply pressure which is considerably above the 37% required for upshifting the 1-2 valve 22. With the valve 22 upshifted, the transmission will be conditioned for second gear operation. The electronic shift control 32 will next require a 2-3 upshift which will establish a duty cycle of 75% and solenoid valve 24 and therefore a control pressure equal to 75% of supply pressure thus initiating an upshift of the 2-3 valve 18 resulting in the transmission being conditioned for operation in third gear.

The electronic shift control will then signal a 3-4 upshift requirement resulting in a 100% duty cycle in solenoid valve 24 which will increase the control pressure in passage 26 so that it is equal to the supply pressure and the 3-4 shift valve 16 will be upshifted resulting in the establishment of the fourth gear within the transmission. As the vehicle encounters driving conditions, such as an upgrade or operator acceleration, requiring a downshift, the electronic shift control 32 will establish the signals so that the control pressure in passage 26 can be varied accordingly and the shift valves will assume the positions required by the pressure ratio between passages 14 and 26. As pointed out above, if the solenoid should have a signal loss, the transmission will be shifted to second gear thus permitting continued operation of the vehicle.

The above description and preferred embodiment utilizes one-way reaction devices as noted. However, those skilled in the art will appreciate that the shift valves utilized in the transmission can be modified to provide fluid pressure control to the various friction drive establishing devices so that they can be engaged and disengaged accordingly, without affecting the shift philosophy found within these systems. It should be noted that there are no hysteresis areas, springs or other mechanical bias members necessary to establish shift point control since the ratio between the control chambers and shift chambers is such that the ratio between any existing control pressure and supply pressure will eliminate any hunting problems which might otherwise occur. That is to say, that a 1-2 upshift will occur when the control pressure is 37% of supply pressure. However, the control pressure is established at discrete levels of either 25% or 50% so that a pressure ratio of exactly 37% will be present for any extended period. It would, of course, be possible to utilize hysteresis areas on the valve spools to insure positive upshifting and downshifting functions if the ratio of the shift control chamber to control chamber for each valve had to be selected to be more closely aligned with the pressure ratio functions which are established between the supply pressure and the control pressure. However, with a four-speed transmission, it is not foreseen that such close control tolerances are necessary and accordingly the hysteresis problems will not arise.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A shift control for a multiratio transmission having fluid pressure operated friction devices and wherein upshifting and downshifting between ratios is controlled by a hydraulic pressure controller which distributes fluid pressure to the friction devices, said control comprising; a plurality of valve means for selectively controlling pressure distribution to the friction devices; each valve means having a control chamber of predetermined area connected with a source of constant pressure and a shift control chamber of predetermined area, greater than the control chamber area, connected to a source of variable pressure in opposition to the constant pressure; and single electrical solenoid means for controlling the pressure level of the variable pressure at a plurality of distinct pressure levels, whereby sequentially changing the variable pressure to each of the distinct pressure levels will result in selected upshifting and downshifting of the valve means thereby selectively controlling the pressure distribution to the friction devices.

2. A shift control for a multiratio transmission having fluid pressure operated friction devices and wherein upshifting and downshifting between ratios is controlled by a hydraulic pressure controller which distributes fluid pressure to the friction devices, said control comprising; a plurality of shift valve means for selectively controlling pressure distribution to the friction devices; each shift valve means having a control chamber of predetermined area connected with a source of constant pressure and a shift control chamber of predetermined area, greater than the control chamber area, connected to a source of variable pressure in opposition to the constant pressure and each shift valve means having an area ratio between the chambers distinct from the other shift valve means; and single electrical solenoid means for controlling the pressure level of the variable pressure at a plurality of distinct pressure levels at values substantially half way between the area ratios of the chambers, whereby sequentially changing the variable pressure to each of the distinct pressure levels will result in selected upshifting and downshifting of the shift valve means.

3. A shift control for a multiratio transmission having fluid pressure operated friction devices and wherein upshifting and downshifting between ratios is controlled by a hydraulic pressure controller which distributes fluid pressure to the friction devices, said control comprising; a plurality of shift valve means for selectively applying or not applying pressures to respective friction devices; each shift valve means having a control chamber connected with a source of reference pressure and a shift control chamber of predetermined area differing from the control chamber area and each shift valve means having an area ratio between chambers distinct from the other shift valve means; a solenoid valve; a fluid flow path extending from the source of reference pressure through the solenoid valve to said control chambers in parallel; and electrical control elements effective to energize the solenoid valve in pulses having varying duty cycles, the electrical control elements pulsing the solenoid in duty cycles productive of pressure ratios at values substantially half-way between the area ratios of chambers.

* * * * *